US008594341B2

(12) United States Patent
Rothschild

(10) Patent No.: US 8,594,341 B2
(45) Date of Patent: Nov. 26, 2013

(54) SYSTEM AND METHOD FOR SELECTIVELY SWITCHING BETWEEN A PLURALITY OF AUDIO CHANNELS

(76) Inventor: Leigh M. Rothschild, Plantation, FL (US)

( * ) Notice: Subject to any disclaimer, the term of this patent is extended or adjusted under 35 U.S.C. 154(b) by 1069 days.

(21) Appl. No.: 10/967,404

(22) Filed: Oct. 18, 2004

(65) Prior Publication Data

US 2006/0083388 A1 Apr. 20, 2006

(51) Int. Cl.
*H04B 1/00* (2006.01)

(52) U.S. Cl.
USPC .......... 381/86; 381/123

(58) Field of Classification Search
USPC .......... 381/123, 74, 110, 77–85, 56–58, 381/71.1–71.14, 86; 700/94; 704/243; 455/556.1, 404.1, 79
See application file for complete search history.

(56) References Cited

U.S. PATENT DOCUMENTS

| | | | | | |
|---|---|---|---|---|---|
| 4,517,417 | A | * | 5/1985 | Murayama | 379/430 |
| 4,658,425 | A | * | 4/1987 | Julstrom | 381/81 |
| 4,754,486 | A | * | 6/1988 | Stafford et al. | 381/86 |
| 4,759,069 | A | * | 7/1988 | Bernstein et al. | 381/56 |
| 4,806,931 | A | * | 2/1989 | Nelson | 340/907 |
| 4,945,570 | A | * | 7/1990 | Gerson et al. | 455/563 |
| 5,182,552 | A | * | 1/1993 | Paynting | 340/825.25 |
| 5,278,553 | A | * | 1/1994 | Cornett et al. | 340/902 |
| 5,495,242 | A | * | 2/1996 | Kick et al. | 340/902 |
| 5,553,312 | A | * | 9/1996 | Gattey et al. | 455/11.1 |
| 5,596,649 | A | * | 1/1997 | Liu | 381/79 |
| 6,349,283 | B1 | * | 2/2002 | Sanders | 704/278 |
| 6,985,592 | B1 | * | 1/2006 | Ban et al. | 381/74 |
| 7,039,205 | B1 | * | 5/2006 | Carter et al. | 381/123 |
| 7,072,476 | B2 | * | 7/2006 | White et al. | 381/74 |
| 7,171,174 | B2 | * | 1/2007 | Ellis et al. | 455/132 |
| 7,187,948 | B2 | * | 3/2007 | Alden | 455/557 |
| 7,742,610 | B1 | * | 6/2010 | Hibino et al. | 381/302 |
| 2001/0046304 | A1 | * | 11/2001 | Rast | 381/74 |
| 2002/0110246 | A1 | * | 8/2002 | Gosior et al. | 381/2 |
| 2002/0150262 | A1 | * | 10/2002 | Carter | 381/86 |
| 2003/0076968 | A1 | * | 4/2003 | Rast | 381/124 |

* cited by examiner

*Primary Examiner* — Vivian Chin
*Assistant Examiner* — Fatimat O Olaniran
(74) *Attorney, Agent, or Firm* — Atanu Das; Techlaw LLP

(57) ABSTRACT

A system and method for selectively switching between a plurality of audio channels are provided. The system and method of the present disclosure will enable a user to listen to desired audio content, e.g., music with a total lack of distraction while selectively allowing certain important and selected sounds to interrupt the audio content. The system for selectively switching between a plurality of audio channels includes an audio content device (ACD) for supplying audio content on a first channel; at least one microphone input device for generating an acoustic signal from sound external to the system on a second channel; an audio signal processing control unit (ASPCU) for receiving the audio content on the first channel and the acoustic signal on the second channel and for selectively switching between the first and second channel; and an audio output device (AOD) for audibly producing sounds from the selected channel.

55 Claims, 4 Drawing Sheets

SYSTEM AND METHOD FOR SELECTIVELY SWITCHING BETWEEN A PLURALITY OF AUDIO CHANNELS

BACKGROUND

1. Field

The present disclosure relates generally to data processing and audio communications systems, and more particularly, to systems and methods for selectively switching between a plurality of audio channels.

2. Description of the Related Art

Audio and video content devices have become more numerous in the past several years with device proliferation and miniaturization. Content devices (both audio and video) have become increasingly portable, and various devices including portable DVD players, cellular telephones, portable radios and televisions, MP3 audio players, network audio players, CD players, portable computers, tape cassette players, PDAs, minidisk players, among others, are now commonplace. The users of these devices take these devices into a variety of environments and use the devices for both business and pleasure. The device users frequently have a desire to enjoy the audio content in virtual exclusion of sounds other then the desired audio content.

Recently, digital noise reduction sound processing, and better headphone designs to isolate sound, have allowed audio headphone users to enhance their audio content listening experience. However, increasingly, the audio headphone devices are used in environments where various noise channels outside the contained headphone environment exist simultaneously. For instance, in an automobile, one source of sound would be the sound coming from the audio device (in this example music content), while another source would be the sounds from outside the car, while a third would be the sounds from within the car. The user frequently has a desire and a need to be able to process all of these distinct sound channels, but the challenge is in processing only the channels that the user has the need to listen to at the specific time the user needs to listen to them. By example, if a user were driving a car, the user may want to only listen to music content in a sealed environment, meaning that only music could be heard to the exclusion of all other sounds and the experience could be further enhanced with digital noise reduction processing. However, prudency and in many cases the laws of the various individual states (in the United States) and other countries require that the user be able to hear certain outside noises while driving. For instance, the sound of a car horn or the sound of an emergency vehicle are two noises that the user would want to (and in many cases be required by law) to hear. Moreover, the user may also have a need to hear other occupants of his vehicle, but in this case, only when it is important for them to be heard.

Therefore, a need exists for systems and methods for selectively switching between various audio channels, for example, between desired audio content and predetermined sound patterns. A need also exists for a system which switches between a plurality of audio channels where one of the audio channels is remote from the user.

SUMMARY

A system and method for selectively switching between a plurality of audio channels with or without user input are provided. The system will receive and audibly produce desired audio content to a user, but will interrupt the audio content when predetermined sound patterns are detected and subsequently play the sound patterns to the user. The system and method of the present disclosure will allow the user to hear external noises (e.g., horns, emergency vehicles, people, etc) outside the user's listening environment, when needed by means of selective switched sound processing. The selective sound processing will selectively allow certain sounds or voices to immediately interrupt and override the audio content, e.g., music. The resulting experience with the system and method of the present disclosure is one where the user can enjoy audio content with a total lack of distraction, until the system and method selectively allows certain important and selected sounds to interrupt the audio content.

According to an aspect of the present disclosure, an apparatus for selectively switching between audio channels is provided. The apparatus includes a first audio input connection for receiving audio content; a second audio input connection for receiving an acoustic signal; a controller for receiving the audio content and acoustic signal and for determining whether to output the audio content or acoustic signal; and an output connection for outputting the determined signal. The apparatus further includes a switching mechanism having a first and second position controlled by the controller, wherein in the first position the first audio input connection is coupled to the output connection and in the second position the second audio input connection is coupled to the output connection.

According to another aspect of the present disclosure, a system for selectively switching between a plurality of audio channels is provided. The system includes an audio content device (ACD) for supplying audio content on a first channel; at least one microphone input device for generating an acoustic signal from sound external to the system on a second channel; an audio signal processing control unit (ASPCU) for receiving the audio content on the first channel and the acoustic signal on the second channel and for selectively switching between the first and second channel; and an audio output device (AOD) for audibly producing sounds from the selected channel.

According to a further aspect of the present disclosure, a headphone for selectively switching between a plurality of audio channels is provided. The headphone includes an audio content device (ACD) for supplying audio content on a first channel; at least one microphone input device for generating an acoustic signal from sound external to the headphone on a second channel; an audio signal processing control unit (ASPCU) for receiving the audio content on the first channel and the acoustic signal on the second channel and for selectively switching between the first and second channel; and first and second speakers for audibly producing sounds from the selected channel.

In yet another aspect of the present invention, a method for selectively switching between a plurality of audio channels in an audio device is provided. The method includes the steps of supplying audio content on a first channel of the audio device; generating an acoustic signal from sound external to the audio device on a second channel; receiving the audio content on the first channel and the acoustic signal on the second channel and selectively switching between the first and second channel; and audibly producing sounds from the selected channel. The method further includes the steps of determining if the acoustic signal matches a predetermined pattern; and if the acoustic signal matches the predetermined pattern, selecting the second channel to be audibly produced, wherein the predetermined pattern is digitized human speech or digitized emergency sounds.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Figure 1:
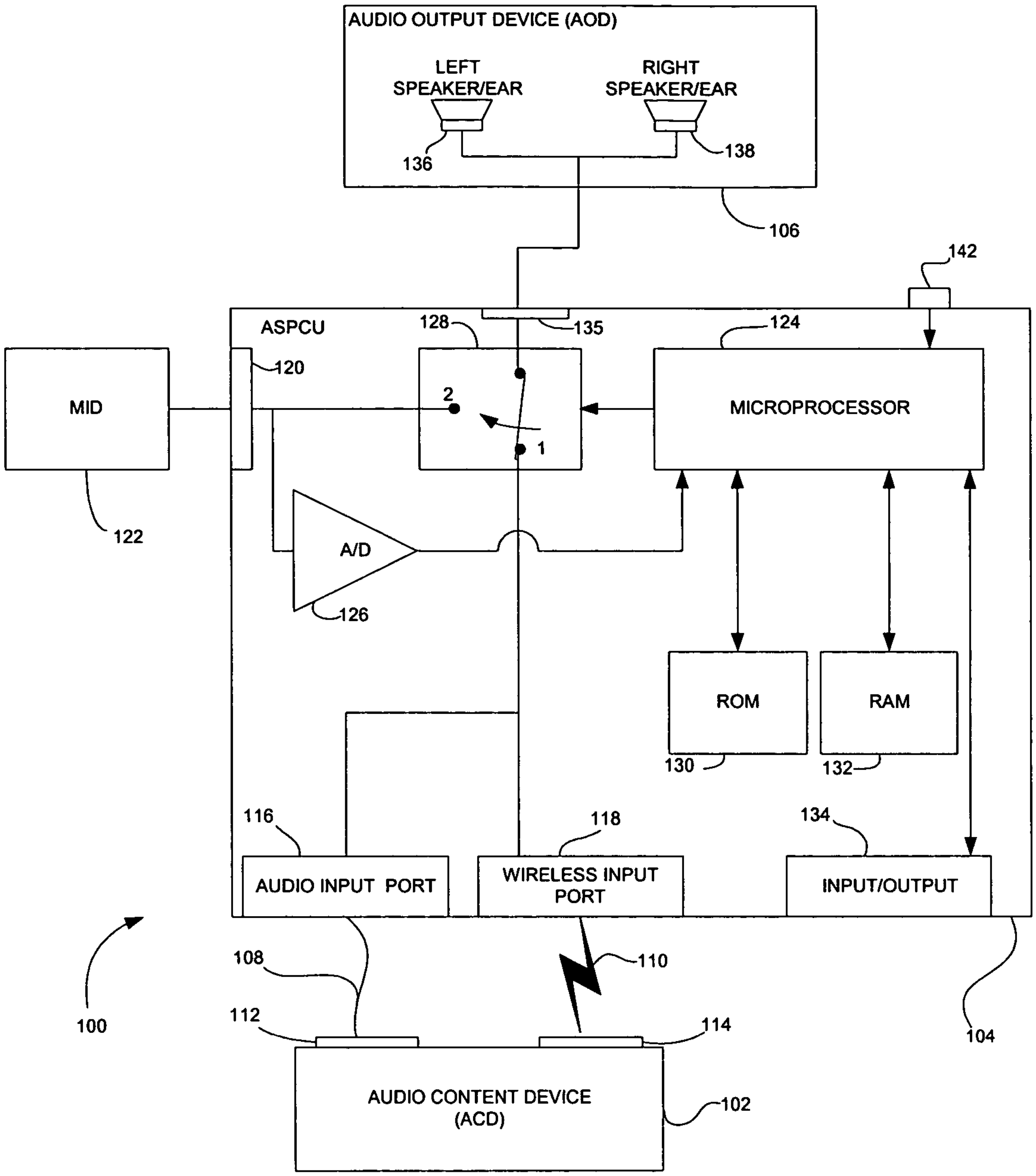
FIG. 1 is a diagram of a system for selectively switching between a plurality of audio channels in accordance with an embodiment of the present disclosure.

Preferred embodiments of the present disclosure will be described hereinbelow with reference to the accompanying drawings. In the following description, well-known functions or constructions are not described in detail to avoid obscuring the present disclosure in unnecessary detail. Throughout the figures like reference numerals represent like elements.

A system and method for selectively switching between a plurality of audio channels are provided. The system and method of the present disclosure will enable a user to listen to desired audio content, e.g., music with a total lack of distraction while selectively allowing certain important and selected sounds to interrupt the audio content.

Referring to FIG. 1, a system for selectively switching between a plurality of audio channels is shown. The system 100 generally includes an audio content device (ACD) 102 for supplying audio content on a first channel, an audio signal processing control unit (ASPCU) 104 for selectively switching between the audio content supplied from the ACD 102 and other audio sources, e.g., a microphone input device 122, on a second channel and an audio output device (AOD) 106 for audibly producing sounds from the selected channel.

The ACD 102 may be any device that produces and delivers an audio signal to the ASPCU 104. Conventional audio content devices include but are not limited to portable DVD players, cellular or mobile telephones, portable radios and televisions, MP3 audio players, network audio players, CD players, portable computers, tape cassette players, personal digital assistants (PDAs), minidisk players, among others. It should be noted that some ACD devices are analog signal devices, while other are based on digital signal processing.

The audio content device (ACD) 102 may be coupled to the ASPCU 104 via hardwired 108 or wireless connection 110. If a hardwired connection is employed, the ACD 102 will include the appropriate output connection 112, e.g., an RCA jack, a USB port, a FireWire port (IEEE 1394), serial port, parallel port, etc. If a wireless connection 110 is employed, the ACD 102 will include a wireless port 114 with an appropriate encoder and transmitter to wirelessly transmit audio content to the ASPCU 104. The wireless connection will operate under any of the various known wireless protocols including but not limited to Bluetooth™ interconnectivity, infrared connectivity, radio transmission connectivity including computer digital signal broadcasting and reception commonly referred to as Wi-X or 80211.X (where x denotes the type of transmission), or any other type of communication protocols or systems currently existing or to be developed for wirelessly transmitting data.

To receive the audio content from the ACD 102, the ASPCU 104 will include at least one audio input port, e.g., an audio input port 116 for hardwired connections and/or a wireless input port 118 for wireless connections. It is to be appreciated that if a wireless connection is employed, the wireless input port 118 of the ASPCU 104 will include conventional circuitry to process the incoming audio content, e.g., a receiver, decoder, demodulator, etc. It is also to be appreciated that depending on the type of ACD 102 used, the input ports 116, 118 of the ASPCU 104 may include further circuitry, e.g., analog-to-digital converters (ADC), digital-to-analog converters (DAC), for converting the incoming signals to an appropriate format to be either processed and/or audibly produced for a user.

The ASPCU 104 is adapted to received and process sounds and/or acoustic signals other then the desired audio content from the ACD 102. The ASCPCU 104 will listen for predetermined sounds and, if necessary, interrupt the audio content being received from the ACD 102 and play the externally generated sound to the user. The ASPCU 104 includes a second audio input port 120 adapted to receive sounds and/or acoustic signals generated externally from system 100. Preferably, a microphone input device (MID) 122 will be coupled to the second audio port 120 for receiving sound and generating an acoustic signal to the ASPCU 104. The MID 122 may be coupled to the ASPCU 104 by the various hardwired and wireless connections described above. If a wireless MID 122 is employed, the wireless MID will include an encoder/modulator for generating an electrical acoustic signal from sound and a transmitter/antenna combination to transmit the acoustic signal to the ASPCU 104. Correspondingly, in the wireless embodiment, the second audio input port 120 will include a receiver and decoder for receiving and decoding the transmitted signal.

The ASPCU 104 will include a microprocessor 124 for receiving the acoustic signal from the MID 122 and for determining whether the acoustic signal should interrupt the audio content being played to allow the user to hear the acoustic signal. Preferably, an output of the MID 122 will be coupled to the ASPCU 104 by an analog-to-digital converter 126 for converting the acoustic signal generated by the MID into a digital form that can be processed by the microprocessor 124. The ASPCU 104 will further include a switching mechanism 128 having at least a first input coupled to the audio input port 116, 118, a second input coupled to the MID 122 and an output coupled to the AOD 106. The switching mechanism 128, e.g., a relay, transistor, etc, is controlled by the microprocessor 124 to allow the audio content from the ACD 102, e.g., a first channel, or the acoustic signal from the MID 122, e.g., a second channel, to be played to the user. Initially, upon starting of the ASPCU 104, the switching mechanism 128 will default to the first position to allow any audio content received by the audio input port 116, 118 to be transmitted to the AOD 106 to be played to the user, via an audio output port 135. During use, the microprocessor 124 will continuously monitor acoustic signals coming from the MID 122. If any acoustic signal matches a predetermined digital pattern, the microprocessor 124 will transmit an output signal to the switching mechanism 128 to set the switching mechanism 128 to the second position. In the second position of the switching mechanism 128, the acoustic signal picked up by the MID 122 will be output to the AOD 106 and played to the user.

The audio output device (AOD) 106 may be any device known in the art to audibly produce sound from electrical signals, for example, a speaker, headphones, an ear bud, etc. Preferably, the AOD 106 will include left 136 and right 138 speakers/ear devices for individual playing separate channels of audio content to produce stereo sound and/or for individual playing sound from the input channels of the ASPCU 104. The AOD 106 may further include an amplifier (not shown) for amplifying the signal to be played, or alternatively, the amplifier may be disposed in the ASPCU 104. The AOD 106 may receive the signals to be played wirelessly as described above, and in this embodiment, the output port 135 will have the necessary wireless components.

The ASPCU 104 may also include conventional digital noise reduction processing circuitry that will allow the ASPCU to process and reduce noise from both the ACD 102 and the MID 122.

As described above, the microprocessor 124 will be constantly monitoring the ACD 102 and the MID inputs for certain digital patterns, e.g., preselected sound patterns, that have been preset into the microprocessor's processing instructions. These executable instructions will be loaded into the microprocessor during an initialization routine from random access memory (ROM) 103. These digital patterns will represent audio sounds that have been digitized. This presetting to recognize certain audio sounds could be programmed from inception by the manufacturer of the system of the present disclosure, or alternatively, could be programmed by the user of the system who would program the ASPCU by means of a computer or other programming device coupled to the ASPCU via input/output port 134. These user-defined patterns will be stored in random access memory (RAM) 132, e.g., internal flash memory, compact flash cards, smartmedia cards, memory stick, a microdrive, etc. These present sounds could include but are not limited to various human voice patterns denoting various words, various human voice patterns denoting stress or emergency, various noise patterns denoting emergency sounds including police cars, ambulances, fire engines, or other sound patterns that the manufacturer, or alternatively, the user wants the ASPCU to recognize.

Figure 2:
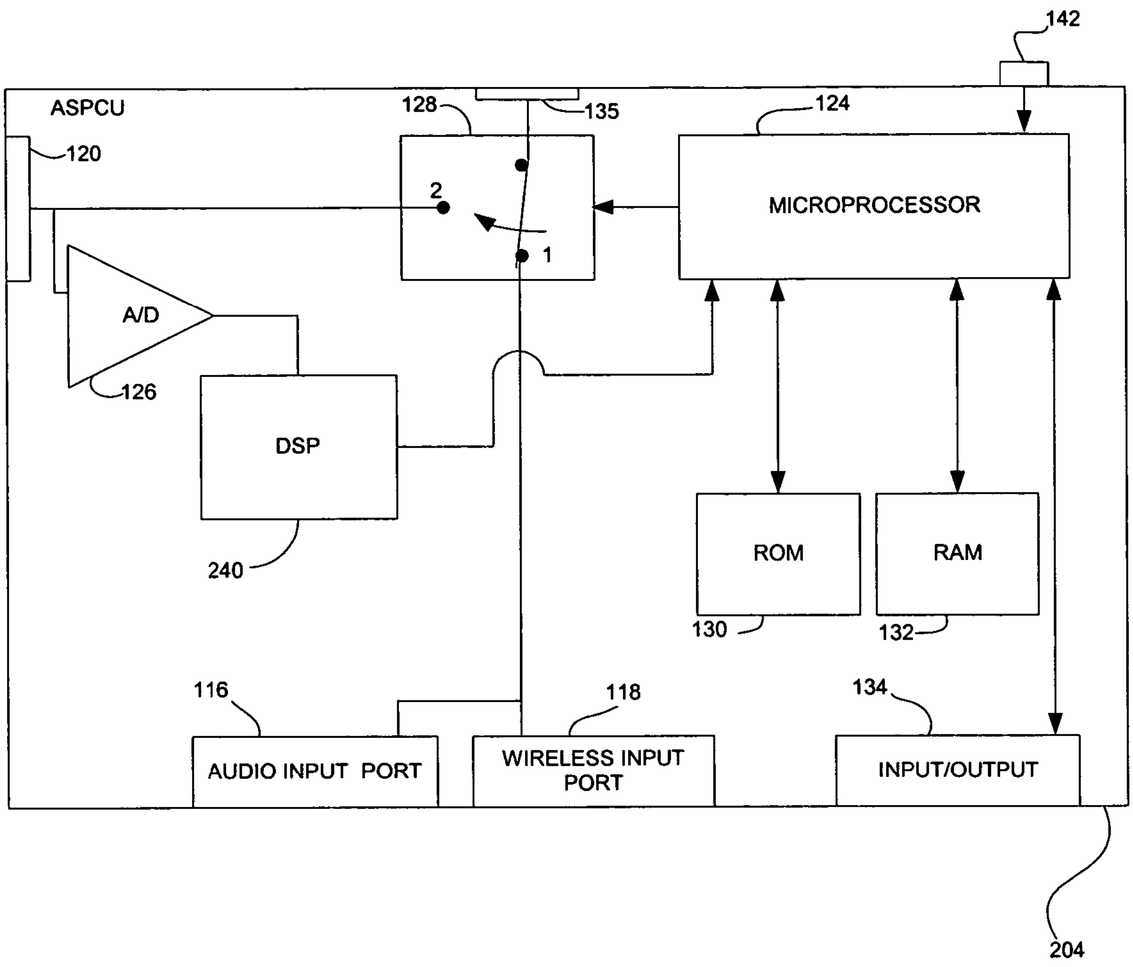
FIG. 2 is diagram of an audio signal processing control unit (ASPCU) for selectively switching between a plurality of audio channels in accordance with an embodiment of the present disclosure.

Conventional computer software programs exist that allow human speech patterns to be converted from a MID or other comparable device, to digital signals (or digital code) and then to allow those signals (code) to be recognized as human words, also known as speech recognition technology. However, since speech recognition technology requires a large amount of processing power, the system's reaction time to external sounds may be slower than required to be effective. Referring to FIG. 2, another embodiment of the ASPCU 204 is illustrated which increases the processing speed of the ASPCU. The ASPCU 204 includes a digital signal processor (DSP) 240 which is functionally similar to a microprocessor but performs one function. Here, the DSP 240 includes a speech recognition algorithm for receiving an acoustic signal from the MID and A/D converter 126 and for determining whether it matches a preset pattern. If the DSP 240 determines a match has occurred, the DSP 240 will transmit a signal to the microprocessor 124 or to the switching mechanism 128 directly. By moving the speech recognition functionality to the DSP 240, the DSP 240 will react quicker than the microprocessor 124 since this is its only function and the microprocessor 124 will be less taxed in performing other functions of the system. Therefore, the overall system response time will be quicker.

It is to be understood that the present disclosure may be implemented in various forms of hardware, software, firmware, special purpose processors, or a combination thereof. A system bus couples the various components shown in FIGS. 1 and 2 and may be any of several types of bus structures including a memory bus or memory controller, a peripheral bus, and a local bus using any of a variety of bus architectures. The system also includes an operating system and micro instruction code. The various processes and functions described herein may either be part of the micro instruction code or part of an application program (or a combination thereof) which is executed via the operating system.

It is to be further understood that because some of the constituent system components and method steps depicted in the accompanying figures may be implemented in software, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure.

When the user utilizes the system of the present disclosure, the user would normally be hearing only sound from the ACD 102 which would be delivered to the user via the AOD 106, e.g., a speaker or headphone. The ACD content would continue to be heard by the user until ASPCU 104, 204 recognizes one of the sound patterns that would come from the MID 122, and the microprocessor 124 of the ASPCU would instruct the switching mechanism 128 to stop the digital output, or alternatively the analog output, of the ACD and quickly switch the user to the MID output. The ASPCU 104, 204 will allow the user to set a time delay for the switch over from the ACD to the MID. After the switch occurs between the ACD 102 and MID 122, the ASPCU will switch back to the audio content from the ACD after either a time delay preprogrammed by the user or after the user manually instructed the ASPCU to switch again to the ACD. This manual instruction could be communicated by speech recognition which would allow the MID to signal the ASPCU and thus the ASPCU to switch back to the ACD or by means of a switch 142 that the user could press located on the AOD 106 or the ASPCU, or any other means that would instruct the ASPCU to make the switch between the MID and the ACD.

In another embodiment, instead of completely switching from the ACD 102 to the MID 122, the ASPCU 104, 204 may lower the volume of the audio content coming from the ACD and play the sounds from the MID at a higher volume. Alternatively, the ASPCU may supply the audio content from the ACD 102 to one output channel, e.g., left speaker 136, and the sound from the MID 122 to the second output channel, e.g., right speaker 138 so the user may simultaneously hear both channels.

In a further embodiment, upon the system 100 switching to the input from the MID 122 or other external sound, the ASPCU 104 may instruct the audio content device 102 to pause from supplying the audio content, or if the source content is live, e.g., radio transmission, satellite transmission, television transmission, etc., the ASPCU 104 may buffer the received audio content in conventional memory buffers or RAM 132. When the system switches back to the audio content device or first channel, the ASPCU will either instruct the audio content device to unpause and resume supplying audio content from the point of interruption or, alternatively, will play the audio content stored in the memory buffer.

Figure 3:
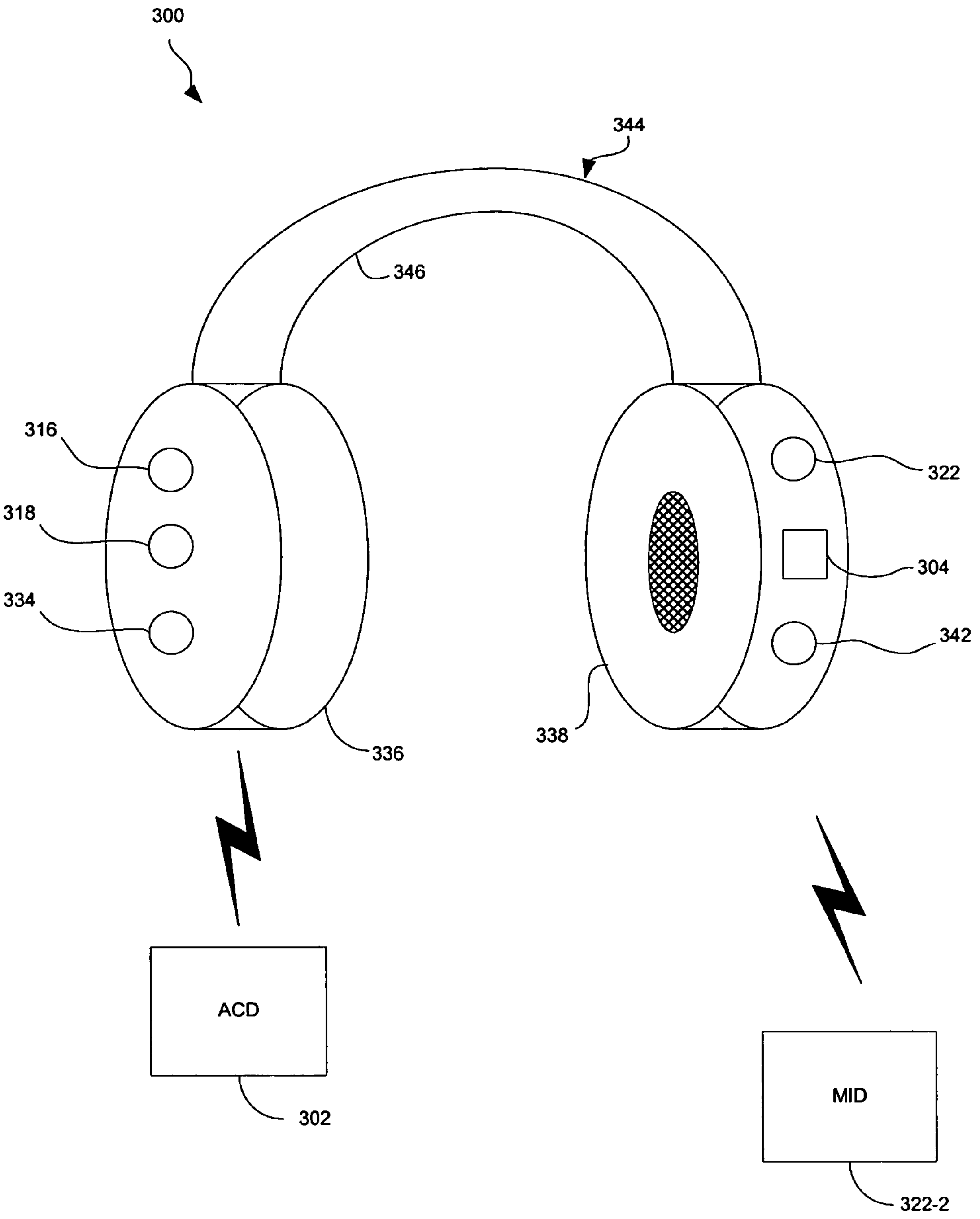
FIG. 3 is a diagram of an exemplary headphone employing a system for selectively switching between a plurality of audio channels in accordance with an embodiment of the present disclosure.

Referring to FIG. 3, another embodiment of the present disclosure is illustrated. The system 300 is embodied in a standard headphone enclosure 344 which is to be used to deliver the audio content to the user. Headphone 344 includes an audio output device in the form of a left speaker 336 and a right speaker 338 coupled together by a band 346 which supports the headphone on the user. It is noted that conventional headphone enclosures come in various shapes and sizes and types and that the present disclosure should not be limited to the headphone illustrated in FIG. 3. The ASPCU 304 may be disposed in either of the speaker housings 336, 338 and the various input/output devices may be located on either speaker housings 336, 338 and/or on the band 346. For this illustration, audio input port 316, wireless input port 318 and input/output port 334 are disposed on the left speaker housing 336; microphone input device 322 and switch 342 are disposed on the right speaker housing 338.

An application of the embodiment shown in FIG. 3 is best illustrated in the context for sound devices that are used in work environments. If a worker wishes to enjoy audio content in a totally immersive environment by wearing headphone 344 connected to an audio content device 302 and yet when another worker needs to get the attention of the first subject worker, the system 300 would allow the other worker to be heard while interrupting and replacing the audio content. Thus, when the worker using the subject device is not needed by coworkers, he can enjoy his audio content without any ambient noise or distraction, and yet when he is needed by other workers, the ASPCU 304 will immediately interrupt that audio content to alert the worker. These audio interruptions can be intelligently and automatically selected based on user programming, and subsequently function with or without user defined input. For instance, the user could program the headphone device 344 so that a certain word would trigger the audio content to be interrupted. When a coworker says this word, the device would automatically switch the outside sound channel (which in this case would be the work environment) into the headphone. Further, the user could also select certain key sounds (for instance, an alarm bell) so that when the ASPCU 304 recognizes this sound, sounds from within the users work environment would automatically replace the previous audio content the user had been listening to.

In a further embodiment, the system 300 may employ multiple MIDs. For example, MID 332-2 may be placed remotely from where the user or ASPCU 304 is located. In this embodiment, the ASPCU may include multiplexing circuitry to receive multiple inputs from the multiple MIDS. Furthermore, the ASPCU may include a digital signal processor employing noise detection technology for determining which of the plurality of MIDs is active and subsequently controlling the multiplexer to receive the active MID.

Figure 4:
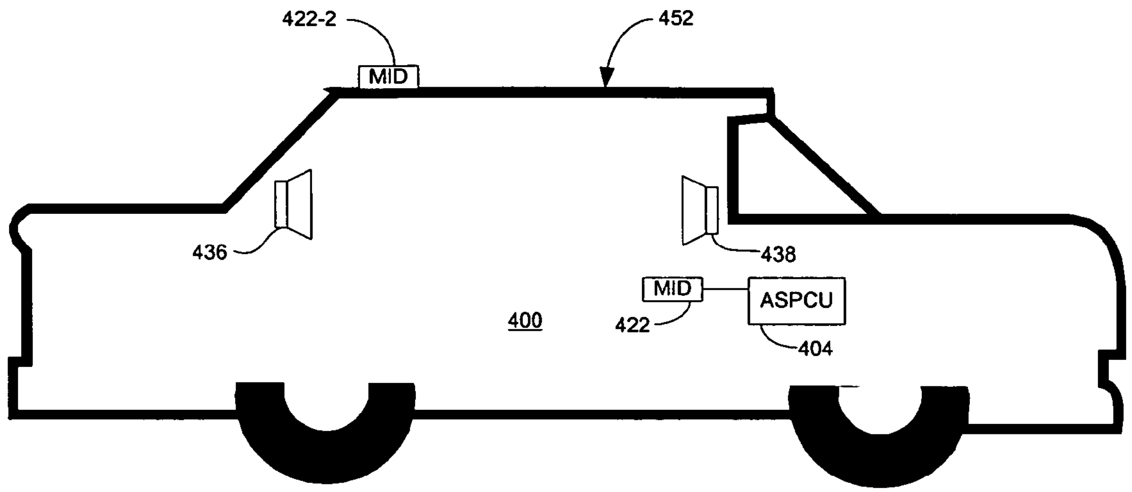
FIG. 4 is a diagram of a vehicle employing a system for selectively switching between a plurality of audio channels in accordance with an embodiment of the present disclosure.

As another example of the advantages of the present disclosure, FIG. 4 illustrates another embodiment of the system of the present disclosure where a user while driving a vehicle can listen to audio content from any source while at the same time being able to selectively hear interior occupants of the vehicle and outside sounds and noises. These exterior sounds would include emergency vehicles, loud and abrupt warning noises, human voices, and other pre-selected noises. Furthermore, the audio content may also be interrupted by select passenger noises. These noises could be selected by the user or defaulted by the manufacturer. An example of these noises would be the word "help", or the word "interrupt" spoken by any person in the vehicle. A loud and abrupt sound could also be used as a trigger to interrupt the audio content. As shown in FIG. 4, a vehicle 452 will include ASPCU 404 coupled to the vehicle's audio system. Preferably, the ASPCU 404 will be disposed in the dashboard for facilitating connection to the vehicle's audio system, e.g., radio, CD player, etc. A first MID 422 will be disposed in the passenger cabin to detect speech uttered by passengers of the vehicle. A second MID 422-2 will be located on an outside surface of the vehicle and may be part of an external antenna used for the vehicle's radio or cellular phone. Upon detection of a predetermined pattern by the ASPCU 404, audio content being played over the vehicle's front speaker 438 and rear speaker 436 will be interrupted and sound detected by either the first or second MID 422, 422-2 will be played over the speakers 436, 438.

In another less preferred embodiment of the present disclosure, no interior environment noises would interrupt the selected audio content. This application of the present disclosure would not only include automobiles but other transportation devices including boats, motorcycles/scooters, personal transportation devices such as the Segway device, aircraft, and other transportation devices.

While the disclosure has been shown and described with reference to certain preferred embodiments thereof, it will be understood by those skilled in the art that various changes in form and detail may be made therein without departing from the spirit and scope of the disclosure as defined by the appended claims.

What is claimed is:

1. An apparatus for selectively switching between audio channels, the apparatus comprising:

a vehicular audio device including:

a first audio input connection located inside the vehicle for receiving audio content;

a second audio input connection for receiving an acoustic signal associated with sound external to the vehicle;

a memory device for prestoring a plurality of predetermined digital sound patterns, each of the plurality of predetermined digital sound patterns corresponding to a preselected external audio sound;

a controller for receiving the audio content from the first audio connection and the acoustic signal from the second audio input connection, for determining whether the acoustic signal matches at least one of the plurality of predetermined digital sound patterns prestored in the memory device, wherein if the acoustic signal associated with sound external to the vehicle matches at least one of the plurality of predetermined digital sound patterns, the controller sends the acoustic signal to an output connection within the vehicle such that the acoustic signal associated with sound external to the vehicle is generated within the vehicle and, if the acoustic signal does not match the at least one of the plurality of predetermined digital sound patterns, the controller outputs the audio content to the output connection that generates an audible signal based on the audio content.

2. The apparatus as in claim 1, further comprising a switching mechanism having a first and a second position controlled by the controller, wherein in the first position the first audio input connection is coupled to the output connection and in the second position the second audio input connection is coupled to the output connection.

3. The apparatus as in claim 1, wherein the first audio input connection is a hardwired port for receiving audio content through a wire.

4. The apparatus as in claim 1, wherein the first audio input connection is a wireless port for receiving audio content wirelessly.

5. The apparatus as in claim 1, wherein the second audio input connection includes at least one microphone input device for generating an acoustic signal from sound external to the apparatus.

6. The apparatus as in claim 5, wherein the at least one microphone input device is located remotely from the second audio input connection.

7. The apparatus as in claim 6, wherein the remote microphone input device communicates to the second audio input connection wirelessly.

8. The apparatus as in claim 2, wherein the controller receives the acoustic signal, determines if the acoustic signal matches one of the predetermined digital sound patterns and, if the acoustic signal matches the one predetermined digital sound pattern, positions the switching mechanism to couple the second audio input connection t the output connection.

9. The apparatus as in claim 8, wherein the one predetermined digital sound pattern is digitized human speech.

10. The apparatus as in claim 8, wherein the one predetermined digital sound pattern is a digitized emergency sounds or preselected sound patterns.

11. The apparatus as in claim 8, wherein the memory device is further configured for storing the audio content received while the second audio input connection is coupled to the output connection.

12. The apparatus as in claim 8, wherein the controller positions the switching mechanism back to couple the first audio input connection to the output connection after a predetermined period of time.

13. The apparatus as in claim 8, further comprising a switch for allowing the user to manually position the switching mechanism.

14. The apparatus as in claim 1, wherein the output connection further comprises an audio output device for audibly producing the audio content or acoustic signal.

15. A system for selectively switching between a plurality of audio channels, the system comprising:

a vehicular audio device including:

an audio content device (ACD) for supplying audio content on a first channel;

at least one microphone input device for generating an acoustic signal from sound external to the vehicle on a second channel;

a memory device for prestoring a plurality of predetermined digital sound patterns, each of the plurality of predetermined digital sound patterns corresponding to a preselected external audio sound;

an audio signal processing control unit (ASPCU) for receiving the audio content on the first channel and the acoustic signal on the second channel for selectively switching between the first and second channel, wherein if the acoustic signal matches at least one of the plurality of predetermined digital sound patterns stored in the memory device, the ASPCU selects the second channel such that an audio output device (AOD) generates the acoustic signal from the second channel based on the acoustic signal from sound external to the vehicle, and if the acoustic signal from sound external to the vehicle does not match the at least one of the plurality of predetermined digital sound patterns stored in the memory device, the ASPCU selects the first channel such that the audio output device (AOD) generates an audible sound from the first channel based on the audio content.

16. The system as in claim 15, wherein the ASPCU further comprises a switching mechanism having a first and second position, wherein the first position the first channel is coupled to the audio output device and in the second position the second channel is coupled to the audio output device.

17. The system as in claim 15, wherein the at least one microphone input device is located is located remotely from the ASPCU.

18. The system as in claim 17, wherein the at least one remote microphone input device communicates to the ASPCU wirelessly.

19. The system as in claim 16, wherein the ASPCU receives the acoustic signal, determines if the acoustic signal matches one of the predetermined digital sound patterns and, if the acoustic signal matches the one predetermined digital sound pattern, positions the switching mechanism to couple the second channel to the audio output device.

20. The system as in claim 19, wherein the memory device is further configured for storing the audio content received while the second channel is coupled to the audio output device.

21. The system as in claim 19, wherein when the second channel is coupled to the audio output device, the ASPCU pauses the audio content supplied from the audio content device.

22. The system as in claim 19, wherein the one predetermined digital sound pattern is digitized human speech.

23. The system as in claim 19, wherein the one predetermined digital sound pattern is a digitized emergency sounds or preselected sound patterns.

24. The system as in claim 19, wherein the ASPCU positions the switching mechanism back to couple the first channel to the audio output device after a predetermined period of time.

25. The system as in claim 19, further comprising a switch for allowing the user to manually position the switching mechanism.

26. The system as in claim 15, wherein the audio content device is located remotely from the ASPCU and communicates to the ASPCU wirelessly.

27. A vehicular audio device for selectively switching between a plurality of audio channels, the headphone comprising:

an audio content device (ACD) for supplying audio content on a first channel;

at least one microphone input device for generating an acoustic signal from sound external to the vehicle on a second channel;

a memory device for prestoring a plurality of predetermined digital sound patterns, each of the plurality of predetermined digital sound patterns corresponding to a preselected external audio sound;

an audio signal processing control unit (ASPCU) for receiving the audio content on the first channel and the acoustic signal on the second channel for selectively switching between the first and second channel, wherein if the acoustic signal matches at least one of the plurality of predetermined digital sound patterns stored in the memory device, the ASPCU selects the second channel such that first and second speakers generate the acoustic signal from the second channel based on the acoustic signal from sound external to the vehicle, and if the acoustic signal from sound external to the vehicle does not match the at least one of the plurality of predetermined digital sound patterns stored in the memory device, the ASPCU selects the first channel such that first and second speakers generate an audible sound from the first channel based on the audio content.

28. The vehicular audio device as in claim 27, wherein the ASPCU further comprises a switching mechanism having a first and second position, wherein the first position the first channel is coupled to the first and second speakers and in the second position the second channel is coupled to the first and second speakers.

29. The vehicular audio device as in claim 27, wherein the at least one microphone input device is located is located remotely from the headphone.

30. The vehicular audio device as in claim 29, wherein the at least one remote microphone input device communicates to the ASPCU wirelessly.

31. The vehicular audio device as in claim 28, wherein the ASPCU receives the acoustic signal, determines if the acoustic signal matches one of the predetermined digital sound patterns and, if the acoustic signal matches the one predetermined digital sound pattern, positions the switching mechanism to couple the second channel to the first and second speakers.

32. The vehicular audio device as in claim 31, wherein the memory device is further configured for storing the audio content received while the second channel is coupled to the audio output device.

33. The vehicular audio device as in claim 31, wherein when the second channel is coupled to the first and second speakers, the ASPCU pauses the audio content supplied from the audio content device.

34. The vehicular audio device as in claim 31, wherein the one predetermined digital sound pattern is digitized human speech.

35. The vehicular audio device as in claim 31, wherein the one predetermined digital sound pattern is a digitized emergency sounds or preselected sound patterns.

36. The vehicular audio device as in claim 31, wherein the ASPCU positions the switching mechanism back to couple the first channel to the first and second speakers after a predetermined period of time.

37. The vehicular audio device as in claim 31, further comprising a switch for allowing the user to manually position the switching mechanism.

38. The vehicular audio device as in claim 27, wherein the ASPCU receive the acoustic signal, determines if the acoustic signal matches the one of the predetermined digital sound patterns and, if the acoustic signal matches the one predetermined digital sound pattern, couples the first channel to the first speaker and couples the second channel to the second speaker.

39. The vehicular audio device as in claim 28, wherein the audio content device is located remotely from the headphone and communicates to the ASPCU wirelessly.

40. A method for selectively switching between a plurality of audio channels in an audio device, the method comprising the steps of:

prestoring a plurality of predetermined digital sound patterns in a memory device, each of the plurality of predetermined digital sound patterns corresponding to a preselected external audio sound;

supplying audio content on a first channel of the audio device;

generating an acoustic signal from sound external to the audio device on a second channel receiving the audio content on the first channel and the acoustic signal on the second channel;

determining whether the acoustic signal matched at least one of the plurality of predetermined digital sound patterns stored in the memory device, wherein if the acoustic signal matches at least one of the plurality of predetermined digital sound patterns stored in the memory device, selecting the second channel such that an audible sound is generated from the second channel based on the acoustic signal, and if the acoustic signal does not match at least one of the plurality of predetermined digital sound patterns stored in the memory device, selecting the first channel such that an audible sound is generated from the first channel based on the audio content wherein the audio device includes a vehicular audio device.

41. The method of claim 40, further comprising the steps of:

determining if the acoustic signal matches one of the predetermined digital sound patterns; and if the acoustic signal matches the one predetermined digital sound pattern, selecting the second channel to be audibly produced.

42. The method as in claim 41, wherein the one predetermined digital sound pattern is digitized human speech.

43. The method as in claim 41, wherein the one predetermined digital sound pattern is a digitized emergency sounds.

44. The method as in claim 41, further comprising the step of switching back to the first channel after a predetermined period of time.

45. The method as in claim 41, further comprising the step of storing the received audio content when the second channel is selected.

46. The method as in claim 41, further comprising the step of pausing the audio content when the second channel is selected.

47. The apparatus as in claim 1, wherein the memory device is a volatile memory storage device.

48. The apparatus as in claim 1, wherein the memory device is a non-volatile memory storage device.

49. The apparatus as in claim 1, wherein the memory device and controller are configured as a single device.

50. The system as in claim 15, wherein the memory device is a volatile memory storage device.

51. The system as in claim 15, wherein the memory device is a non-volatile memory storage device.

52. The system as in claim 15, wherein the memory device is disposed in the ASPCU.

53. The headphone as in claim 27, wherein the memory device is a volatile memory storage device.

54. The headphone as in claim 27, wherein the memory device is a non-volatile memory storage device.

55. The headphone as in claim 27, wherein the memory device is disposed in the ASPCU.

* * * * *